US006679508B2

(12) United States Patent
Smith, Jr. et al.

(10) Patent No.: US 6,679,508 B2
(45) Date of Patent: Jan. 20, 2004

(54) FLEXIBLE NO-LASH DRIVE PLATE

(75) Inventors: Ronald G. Smith, Jr., New Carlisle, OH (US); Michael L. Oliver, Xenia, OH (US); William C. Kruckemeyer, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 128 days.

(21) Appl. No.: 09/968,060

(22) Filed: Oct. 1, 2001

(65) Prior Publication Data
US 2003/0062214 A1 Apr. 3, 2003

(51) Int. Cl.[7] .............................. B62D 1/00; F16F 9/50
(52) U.S. Cl. .................... 280/90; 280/89.13; 188/267.2
(58) Field of Search ................ 280/89, 89.13, 280/90; 188/267.1, 267.2; 180/417, 444

(56) References Cited

U.S. PATENT DOCUMENTS

| 4,200,003 A | * | 4/1980 | Miller ......................... 74/574 |
|---|---|---|---|
| 4,352,304 A | * | 10/1982 | Warner ........................ 280/90 |
| 4,896,754 A | * | 1/1990 | Carlson et al. ............. 192/21.5 |
| 5,730,531 A | * | 3/1998 | Pinkos et al. ................. 384/99 |
| 5,829,319 A | * | 11/1998 | Mokeddem .................. 74/574 |
| 6,095,295 A | * | 8/2000 | Park et al. ............... 188/267.2 |
| 6,464,050 B2 | * | 10/2002 | Smith ...................... 188/267.1 |
| 6,508,480 B2 | * | 1/2003 | Smith ......................... 180/400 |
| 6,547,043 B2 | * | 4/2003 | Card ......................... 280/779 |

* cited by examiner

Primary Examiner—Daniel G. DePumpo
(74) Attorney, Agent, or Firm—Scott A. McBain

(57) ABSTRACT

The subject inventive steering damper assembly includes a rotor sleeve having open first and second ends and a drive plate disposed in the open second end. A core is co-axially disposed in the rotor sleeve closing the open first end of the rotor sleeve and defining a magnetic fluid chamber with the sleeve. A Magneto-Rheological fluid is disposed in the magnetic fluid chamber. The drive plate is flexible to provide manufacturing and operational tolerance, and is securely attached to the open second end of the rotor sleeve. Flexibility is derived from at least one aperture disposed in the drive plate. The aperture may be formed in a variety of shapes including elongated, round and oval shaped apertures.

6 Claims, 3 Drawing Sheets

FLEXIBLE NO-LASH DRIVE PLATE

BACKGROUND OF THE INVENTION

1. Field of the Invention

The subject invention relates generally to vibration damping of suspension and steering systems in a motor vehicle. More specifically, the subject invention relates to vibration damping using a flexible drive plate in a rotary type damper.

2. Description of the Prior Art

Rotary dampers have been installed in both steering and suspension assemblies of motor vehicles to dampen the amount of vibration detected by the vehicle operator from such variables as vehicle speed, road bumps, wheel alignment, wheel chatter, and tread wear. Rotary dampers of this type reduce the amount of vibration transferred to the vehicle operator by resisting rotational velocity generated from a pinion associated with either the steering assembly or the suspension assembly. The rotational velocity is resisted by torque generated by the rotary damper thereby reducing the vibration transfer to the driver. The torque is derived from a clutch-like sheer resistance generated by a fluid, generally Newtonian, when a rotor disposed within a vibration damper assembly and operatively connected to the pinion receives rotational velocity from the pinion.

The rotational velocity generated by the pinion connected to the rotary damper varies with the amount of vibration absorbed from the operating variables. A variable level of torque is required to provide uniform damping at both high rotational velocities and at low rotational velocities.

A typical rotary damper assembly that utilizes Magneto-Rheological (MR) fluids includes a core disposed within a housing. The core is operatively connected to a rotational velocity-generating member, such as a pinion, that is connected to a steering or suspension assembly. A conductive sleeve is positioned between the housing and the core. A coil is positioned adjacent the sleeve and is capable of generating a magnetic field that is transmitted through the sleeve. An annular plate separates the core from the sleeve and defines a viscous chamber and a Magneto-Rheological fluid chamber. The viscous chamber is disposed between the sleeve and the housing and the MR chamber is disposed between the sleeve and the core. A viscous fluid is contained within the viscous chamber and MR fluid is contained within the MR chamber. The viscous fluid behaves as a Newtonian fluid throughout operation of the assembly. The MR fluid behaves as a Bingham plastic when it is subjected to the magnetic field and, otherwise, behaves as a Newtonian fluid.

The steering damper provides the ability to vary the amount of torque generated by the vibration damper assembly. When not subjected to the magnetic field, the torque is generated by the Newtonian fluid, which is preferable at low velocity. When subjected to the magnetic field, the MR fluid is transformed from a Newtonian fluid to a Bingham plastic, which generates a torque that is preferable at higher velocities.

Although this type of damper design has proven to be reliable, binding can occur when the rotor is pulled out of alignment with the core by the end of the pinion shaft as a result of misalignment due to production and dimensional tolerances. This misalignment, also known to those of skill in the art as runout, is a problem inherently due to dimensional tolerance conditions that allow axial misalignment. Also, any looseness or lash in the spline coupling between the pinion shaft and the rotor allows vibration to bypass the damper undamped. This looseness is due to necessary build clearances in the spline dimensions and normal wear.

SUMMARY OF THE INVENTION AND ADVANTAGES

The subject invention provides a steering damper assembly comprising a rotor sleeve having a first end adapted to be mounted to a pinion shaft. A drive plate is disposed on the open first end of the rotor sleeve. A core is co-axially disposed in the rotor sleeve and closes the open second end defining a magnetic fluid chamber between the core and the rotor sleeve. A Magneto-Rheological (MR) fluid is injected into the MR fluid chamber. The MR fluid includes a variable shear force when subjected to a magnetic field to provide a torque resistance to the rotational velocity derived from the pinion.

The drive plate is flexible and securely attached to the open first end of the rotor sleeve. The pinion is inserted through the drive plate and is secured by a nut. The drive plate receives flexibility from a plurality of drive plate holes disposed in the surface. The flexibility in the drive plate increases the manufacturing tolerance of the assembly. Therefore, if the pinion is not properly aligned with the core when being mated to the assembly, the drive plate will flex to provide a broader access to the core. Further, if the pinion is received by the core in a non-aligned orientation, the drive plate will remain in a flexed state to provide the necessary access to the core. Therefore, the damping properties of the assembly will not be reduced if the final alignment of the pinion with the core is not precise due to manufacturing variability. Clamping the drive plate to the pinion shaft with a nut provides an initial alignment and a lash free connection not provided by a splined connection.

A further advantage of the apertures bored through the flexible drive plate is the ability to inject damping fluid through the apertures into the steering damper assembly during the manufacturing process. Thus, the complexity and difficulty of manufacturing the steering damper is reduced with the addition of the apertures in the drive plate.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a front view of the drive plate showing drive plate apertures;

DETAILED DESCRIPTION OF THE PREFERRED EMBODIMENT

Figure 1:
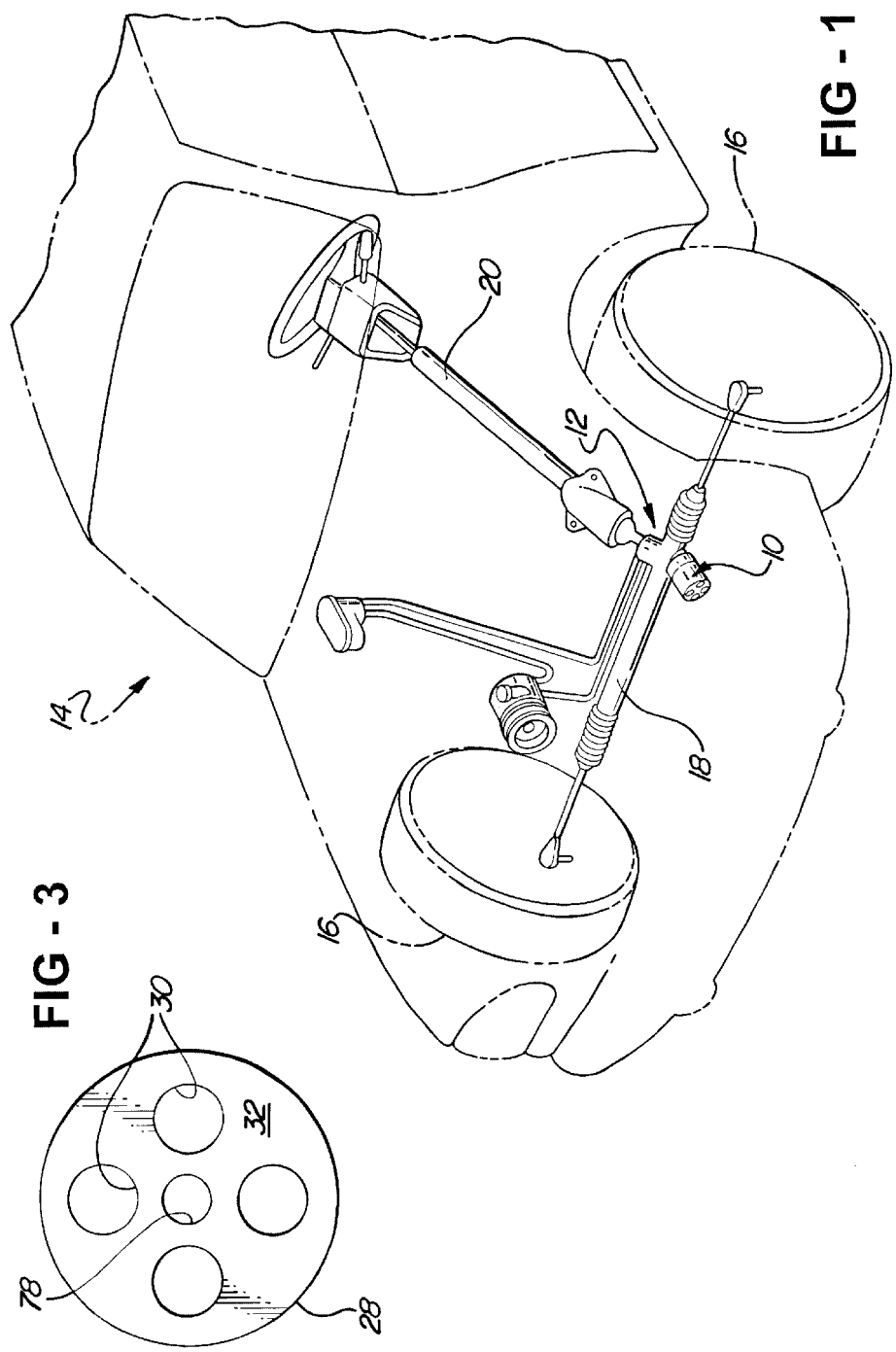
FIG. 1 is an environmental view of the inventive damper assembly attached to a steering assembly.

Referring to FIG. 1, a steering damper assembly shown generally at 10, is installed in a steering system generally shown at 12, of a motor vehicle generally shown at 14. The assembly 10 absorbs rotational energy derived from the wheels 16 of the motor vehicle 14 through the power steering assembly 18. The rotational energy is derived from such driving variables as vehicle speed, road bumps, wheel misalignment, wheel chatter and tread wear. The assembly 10 reduces the amount of the vibrational forces transferred to a vehicle driver through a steering column 20 of the motor vehicle 14.

Figure 2:
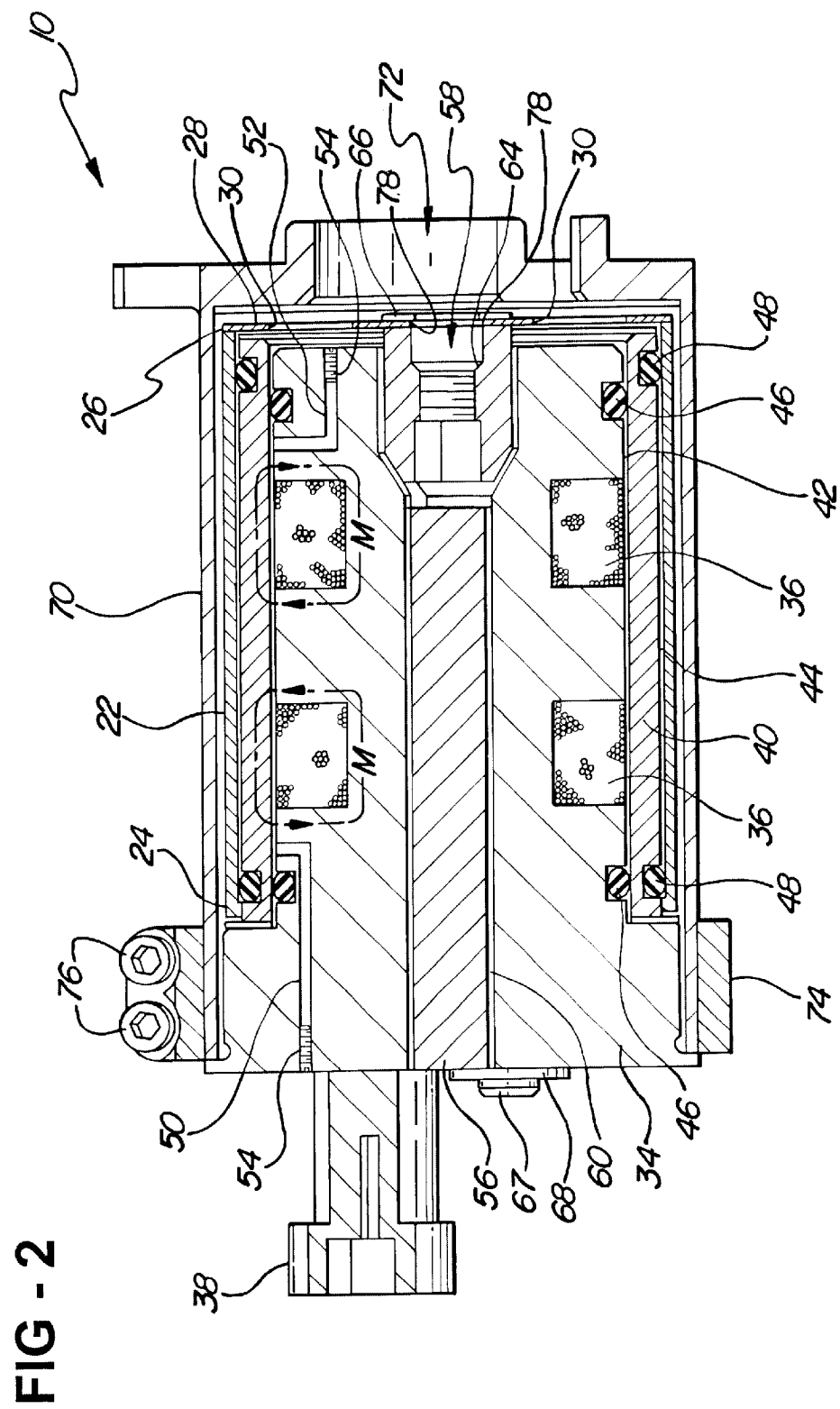
FIG. 2 is a sectional view of the inventive damper assembly.

The method by which the inventive assembly 10 reduces the vibrational forces transferred to the vehicle driver is best explained by referring to FIG. 2 wherein a cross-sectional view of the assembly 10 is shown. A rotor sleeve 22 defines a first opened end 24 and a second end 26 to which a drive plate 28 is affixed. The drive plate 28 is relatively thin and has planar sides extending radially inwardly from the open end 24 of the sleeve 22. The drive plate 28 includes flexible characteristics that enable the drive plate 28 to absorb manufacturing variation from the assembly thereby improving the vibrational absorbing characteristics of the assembly 10. The drive plate 28 may be attached to the rotor sleeve 22 through a variety of attaching methods including welding, fusing, soldering, flanging, bonding, and any number of equivalent methods of attachment.

Figure 4:
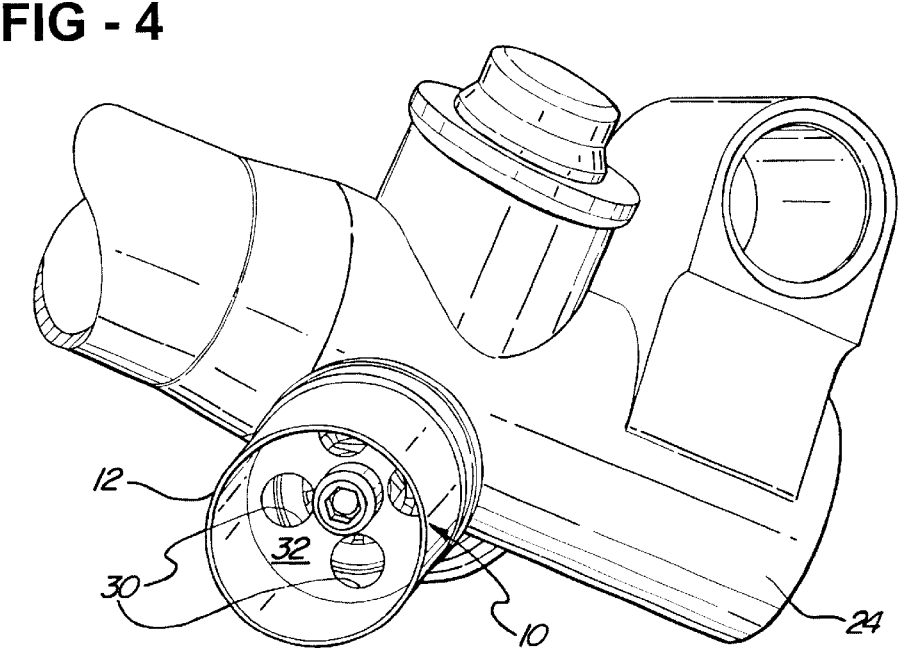
FIG. 4 shows the drive plate 28 and rotor sleeve 22 attached to the pinion with the nut 64. Other parts are not shown for clarity.

As shown in FIGS. 3 and 4, the drive plate 28 preferably derives flexibility from a plurality of drive plate apertures 30 disposed in a planar surface 32 of the drive plate 28, In another embodiment of the present invention, flexibility in the drive plate 28 may also be derived through the utilization of a rigid substrate having a thickness enabling flexibility from the drive plates 28 original plane. Alternatively, a substrate having flexible and resilient qualities may also be used. Other novel aspects of the inventive drive plate 28 will be explained further below.

Returning to FIG. 2, a core 34 is inserted through the first end 24 of the rotor sleeve 22. The core 34 includes at least one coil 36 capable of receiving electric current thereby generating a magnetic field (M). Preferably, the assembly 10 will include at least two coils 36 to generate at least two magnetic fields (M). The coil 36 receives electric current through an electrical connector 38, which receives electric current from the vehicle's electrical system (not shown) as directed by a controller (not shown). An inner sleeve 40 is disposed between the rotor sleeve 22 and the core 34. The inner sleeve 40 defines a Magneto-Rheological fluid chamber 42 with the core 34 and a viscous fluid chamber 44 with the rotor sleeve 22.

When subjected to the magnetic field (M) generated by the coil 36, the sheer properties of the MR fluid are altered. When not subjected to a magnetic field, the MR fluid behaves much like a Newtonian fluid providing a sheer resistance resembling a Newtonian fluid. However, when subjected to a magnetic field, the sheer resistance of the MR fluid is increased proportionally to the strength of the magnetic field (MR). Under the magnetic field, the MR fluid behaves like a Bingham plastic providing a sheer resistance resembling a Bingham plastic. Therefore, the assembly 10 can provide a variable amount of vibrational resistance by adjusting the amount of sheer forces in the MR fluid relative to the strength of magnetic field (M) the fluid is subjected to.

As stated above, the MR fluid retains Newtonian sheer characteristics when not subjected to the magnetic field (M). The viscous fluid retains Newtonian properties throughout operation of the assembly 10. When subjected to the magnetic field (M) generated by the coil 36, the viscosity of the MR fluid increases and stabilizes establishing sheer characteristics of a Bingham plastic. Therefore, a variable amount of torque can be generated by the core 34 through the combination of the viscous fluid and the MR fluid. When the coils 36 are not energized and the MR fluid is not subjected to a magnetic field, the MR fluid provides less resistance to movement than the viscous fluid In this state, relative rotation of the damper parts occurs across the MR fluid chamber 42, with damping provided by the MR fluid viscosity. When a low level of coil excitation provides a low-level magnetic field M, the MR fluid becomes more viscous and provides more damping. As the coil excitation and magnetic field is increased, the damping provided by the MR fluid is increased until the damping provided by the MR fluid exceeds the damping provided by the viscous fluid. In this state, the relative rotation and damping occurs in the viscous fluid, providing an upper limit to damping torque provided.

An MR seal 46 is disposed at each end of the MR fluid chamber 42 to prevent MR fluid from leaking out of the chamber 42. Likewise, a viscous seal 48 is disposed at each end of the viscous chamber 44 to prevent viscous fluid from leaking from the viscous chamber 44.

A first MR fluid bore 50 and a second MR fluid bore 52 are disposed in opposing ends of the core 34. MR fluid is injected into the MR fluid chamber 42 through one of the first and second MR fluid bores 50, 52, subsequent to affixing the inner sleeve 40 over the core 34. Air and excess MR fluid is allowed to flow out of the MR fluid bore 50, 52 not being used to inject the MR fluid into the MR fluid chamber 42. Subsequent to filling the MR fluid chamber 42 with MR fluid, the first and second MR fluid bore 50, 52 are sealed with plug screws 54. Therefore, it is preferable that the ends of the MR fluid bores 50, 52 are threaded to threadably receive the plug screws 54.

A core plug 56 is received by a center bore 58 disposed along a pivotal axis of the core 34. A plug sleeve 60 receives the core plug 56 prior to inserting the core lug 56 into the center bore 58. The core plug 56 includes magnetic properties to the magnetic characteristics of the magnetic field (M). The center bore 58 increases in diameter at the second end 26 of the rotor sleeve 22 to receive a pinion (not shown) from the power steering assembly 18. A female threaded nut 64 is disposed in the center bore 58 in the larger diameter area of the center bore 58 to secure the pinion to the drive plate 28. A spacer washer 66 is positioned between the female nut 64 and the pinion to clamp the plate 28 between the pinion and the core plug 56 around the center bore 58.

Subsequent to assembling each of the components to the core 34 including the rotor sleeve 22, the inner sleeve 40, and the core plug 56, an assembly case 70 is secured thereover. The case 70 includes a pinion bore 72, which provides access to the female nut 64 and the center bore 58 for the pinion 62. The case 70 is secured to the core 34 with a clamp 74. At least one clamp screw 76 is used to tighten the clamp 74 around the case 70.

As demonstrated in the description detailed above, the pinion is inserted through a central aperture 78 and the drive plate 28 and is secured by a nut 64 as best seen in FIGS. 2 and 4. Due to the flexible nature of the drive plate 28, slight angular misalignments of the pinion with the drive plate 28 and rotor sleeve 22 will not adversely affect the performance of the assembly 10. Clearance is provided between the central aperture 78 and the pinion. This allows the rotor sleeve 22 and the inner sleeve 40 to be held in alignment with the core 34 by the centering actions of the seals 46, 48 while the nut 64 is tightened to secure the flex plate 28 to the pinion. The drive plate aperture 30 provides additional manufacturing benefits to the assembly 10. It should be understood that the viscous fluid may optionally be injected through the drive plate aperture 30 into the viscous fluid chamber 44 during the manufacturing process.

Figure 5:
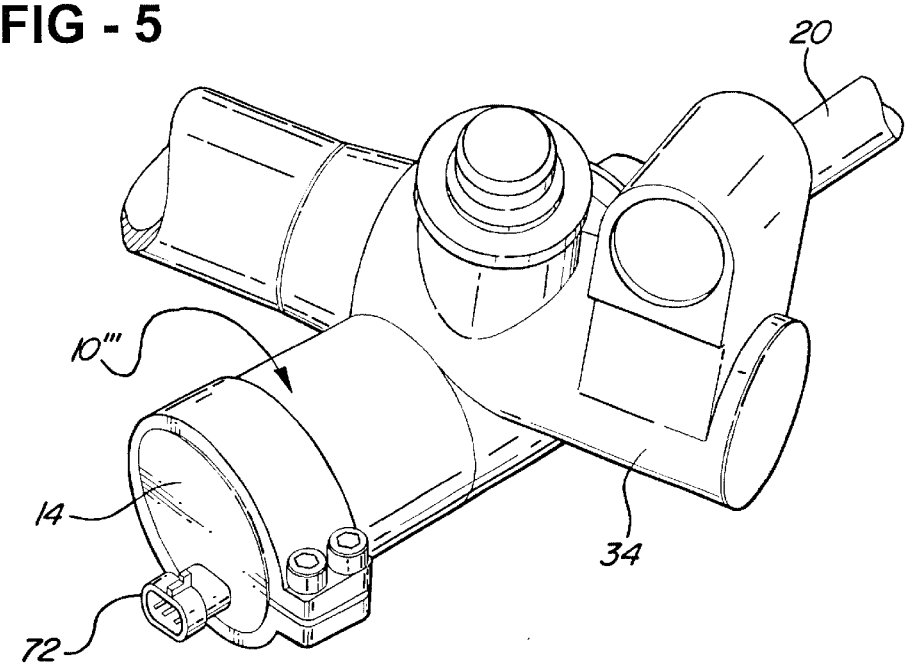
FIG. 5 is a perspective view of the inventive damper assembly interfacing to a steering assembly showing the damper housing.

FIG. 5 shows a close-up view of the inventive steering damper assembly 10 affixed to a pinion of the steering assembly 18. Vibrations generated in the steering assembly 18 are transformed to the steering column 20 in the form of rotational velocity. The rotational velocity is absorbed by the steering damper assembly 10 due to the torque generated by the shear forces in the viscous and MR fluids.

Obviously, many modifications and variations of the present invention are possible in light of the above teachings. The invention may be practiced otherwise than as specifically described within the scope of the appended claims.

What is claimed is:

1. A steering damper assembly comprising:

a rotor sleeve having open first and second ends;

a core co-axially disposed in said rotor sleeve and closing said open second end defining a magnetic fluid chamber therebetween for receiving a Magneto-Rheological (MR) fluid therein said core including a centrally disposed core plug; and a relatively thin drive plate having planar sides extending radially between said open first end of said rotor sleeve and said core plug for being driven with said core plug and being flexible for flexing circumferential between said core plug and said rotor sleeve.

2. A steering damper assembly as set forth in claim 1 further including an inner sleeve disposed in and concentrically aligned with said rotor sleeve for defining a viscous fluid chamber between said inner sleeve and said rotor sleeve, said inner sleeve coaxially disposed about said core defining said magnetic fluid chamber.

3. A steering damper as set forth in claim 2 further including a case having an end adapted to receive a pinion shaft, said case coaxially disposed about said rotor sleeve defining a rotation chamber between said tubular sleeve and said rotor sleeve, said rotor sleeve rotating therein in response to a force.

4. A steering damper assembly as set forth in claim 3 further including a clamp assembly disposed on said case for clamping said case to said core.

5. A steering damper assembly as set froth in claim 1, said drive plate being thin enough to flex out of its plane in response to a load.

6. A steering damper assembly comprising:

a rotor sleeve having open first and second ends;

a drive plate disposed on said open first end of said rotor sleeve and being matable to a pinion;

a core co-axially disposed in said rotor sleeve and closing said open second end defining a magnetic fluid chamber therebetween for receiving a Magneto-Rheological (MR) fluid therein; and wherein said drive plate is flexible and securely attached to said open first end of said rotor sleeve; and wherein said drive plate defines at least one aperture for providing flexibility to said drive plate.

\* \* \* \* \*